(12) United States Patent
Maggiari et al.

(10) Patent No.: US 9,007,916 B2
(45) Date of Patent: Apr. 14, 2015

(54) NETWORK MANAGEMENT UTILIZING TOPOLOGY ADVERTISEMENTS

(75) Inventors: Massimiliano Maggiari, Genoa (IT); Francesca Bruzzone, Cogoleto (IT); Carla Marcenaro, Genoa (IT)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 133 days.

(21) Appl. No.: 13/807,695

(22) PCT Filed: Jun. 28, 2010

(86) PCT No.: PCT/EP2010/059137
§ 371 (c)(1),
(2), (4) Date: Feb. 28, 2013

(87) PCT Pub. No.: WO2012/000534
PCT Pub. Date: Jan. 5, 2012

(65) Prior Publication Data
US 2013/0182608 A1   Jul. 18, 2013

(51) Int. Cl.
*H04J 1/16* (2006.01)
*H04L 12/28* (2006.01)
*H04L 12/24* (2006.01)
*H04L 12/701* (2013.01)
*H04L 12/26* (2006.01)

(52) U.S. Cl.
CPC ............ *H04L 41/12* (2013.01); *H04L 41/0226* (2013.01); *H04L 43/0894* (2013.01); *H04L 45/00* (2013.01)

(58) Field of Classification Search
USPC .................................. 370/236, 238, 400, 465
See application file for complete search history.

(56) References Cited

U.S. PATENT DOCUMENTS

| 7,652,983 | B1 | 1/2010 | Li et al. | |
|---|---|---|---|---|
| 2002/0035641 | A1* | 3/2002 | Kurose et al. | 709/241 |
| 2003/0189920 | A1* | 10/2003 | Erami et al. | 370/351 |
| 2007/0086455 | A1 | 4/2007 | Allan et al. | |
| 2007/0165546 | A1* | 7/2007 | Greenberg et al. | 370/254 |
| 2007/0177523 | A1* | 8/2007 | Nagami et al. | 370/252 |
| 2008/0019688 | A1* | 1/2008 | Sun et al. | 398/2 |

(Continued)

FOREIGN PATENT DOCUMENTS

EP   1463235 A1   9/2004

OTHER PUBLICATIONS

International Search Report, Application No. PCT/EP2010/059137, dated Mar. 4, 2011, 2 pages.

*Primary Examiner* — Andrew Lee
(74) *Attorney, Agent, or Firm* — Blakely Sokoloff Taylor & Zafman LLP (57) ABSTRACT

A network management node of a connection-oriented network listens to topology advertisements in a control plane of the network and stores information carried in the topology advertisements. The node selectively sends Link Management Protocol (LMP) requests based on the information carried in the topology advertisements. The LMP requests can be performed for at least one of the following events: adjacency addition; addition of a link between nodes; deletion of a link between nodes; modification to the bandwidth of a link between nodes. The information collected in the topology advertisements is translated into a format compatible with an Operations Support System (OSS) model.

21 Claims, 5 Drawing Sheets

(56) References Cited

U.S. PATENT DOCUMENTS

| | | | |
|---|---|---|---|
| 2008/0151783 A1 | 6/2008 | Bamba | |
| 2008/0247393 A1* | 10/2008 | Ong et al. | 370/392 |
| 2009/0323522 A1* | 12/2009 | Deguchi | 370/228 |
| 2010/0124177 A1* | 5/2010 | Nishi | 370/252 |
| 2010/0254397 A1* | 10/2010 | Nishi | 370/401 |
| 2012/0170486 A1* | 7/2012 | Mohapatra et al. | 370/254 |
| 2012/0307644 A1* | 12/2012 | Gandhi et al. | 370/241 |
| 2013/0039220 A1* | 2/2013 | Ruffini et al. | 370/255 |

* cited by examiner

NETWORK MANAGEMENT UTILIZING TOPOLOGY ADVERTISEMENTS

CROSS-REFERENCE TO RELATED APPLICATIONS

This application is a National stage of International Application No. PCT/EP2010/059137, filed Jun. 28, 2010, which is hereby incorporated by reference.

TECHNICAL FIELD

This invention relates to a network management system, such as Operation Systems and Support (OSS), of a connection-oriented network such as a Generalised Multi-Protocol Label Switching (GMPLS) network.

BACKGROUND

A Generalised Multi-Protocol Label Switching (GMPLS) network can comprise circuit-switched networks, e.g. using Synchronous Digital Hierarchy (SDH) or Wavelength Division Multiplexed (WDM) transport equipment, packet-switched networks, e.g. using Ethernet transport equipment, or a mix of circuit-switched and packet-switched networks.

GMPLS networks can be quite dynamic in terms of their topology (e.g. number of nodes, and links between nodes) and the bandwidth available for links. Topology resources of the network are described by Management Information Bases (MIB), defined by the Internet Engineering Task Force (IETF). MIBs are stored at each network node. Two network protocols are used to collect topology information for the MIBs: Open Shortest Path First with Traffic Engineering extensions (OSPF-TE) and Link Management Protocol (LMP). OSPF is a routing protocol and therefore is able to collect network topology information across a wide area. LMP only collects topology information related to the node neighbours. The topology information collected via LMP is more detailed than that collected via OSPF, and includes fine-grained information about service provisioning and topology management in terms of the data plane and the Data Communication Network (DCN). The Data Communication Network comprises a Signalling Communication Network (SCN) and a Management Communication Network (MCN). SCN is the network infrastructure that allows the nodes participating in the control plane to talk to each other to exchange protocol information such as LMP and OSPF-TE. MCN is the infrastructure used by the nodes to send and receive information to/from the network management system, called Operation Systems and Support (OSS). Each network element runs a protocol stack that includes both the OSPF and LMP protocols.

The management system, or Operation Systems and Support (OSS), oversees operation of a GMPLS network. Typically, with conventional GMPLS network management systems, a human operator is required to manually perform node installation and link creation. This is a tedious and error-prone approach. Some enhancements have been implemented in the Ericsson GMPLS OSS application "ServiceOn™". An example of the current implementation will now be described. Firstly, a human operator can request a topology discovery by selecting the relevant OSPF routing area ID of a routing area and a RouterID (in terms of IP Address) that is part of the selected routing area. The system asks to the specified RouterID the list of the nodes that are advertised in the selected OSPF routing area. This is achieved by OSPF MIB "GET" operations. For each node in the gathered list, the system will use a thread pool to start LMP queries in parallel to obtain the relevant information about: Adjacencies; TE Links and related components; and Control Channels. Information collected using the above method is merged to build an OSS topology model in a database.

The approach described above has a disadvantage of requiring a significant amount of control plane signalling (i.e. OSPF signalling and LMP signalling) within the network, solely to gather the information required for the OSS topology model. This also incurs a processing overhead at nodes of the network and the OSS.

SUMMARY

An aspect of the invention provides a method of operating a network management node of a connection-oriented network. The method comprises listening to topology advertisements in a control plane of the network and storing information carried in the topology advertisements. The method further comprises selectively sending Link Management Protocol (LMP) requests based on the information carried in the topology advertisements.

An advantage of the management system listening to topology advertisements (e.g. carried by OSPF-TE Link State Advertisements) is that the management system always has up-to-date topology information of the network, even when the topology (e.g. number of nodes, links, bandwidth) of the network is dynamic. This avoids the need to perform control plane signalling solely to collect the topology information for the management system, and avoids the delay while the topology information is collected. It also reduces the amount of processing at nodes of the network. It also reduces, or avoids, the need for manual operator intervention.

An advantage of selectively performing Link Management Protocol (LMP) requests is a reduction in LMP signalling within the network, and a reduction in the processing of LMP messages at nodes of the network.

Advantageously, the step of selectively sending Link Management Protocol requests is performed for at least one of the following events: adjacency addition; addition of a link between nodes; deletion of a link between nodes; modification to the bandwidth of a link between nodes.

Advantageously, the information collected in the topology advertisements is translated into a format compatible with an Operations Support System (OSS) model. This provides the network management system with outputs (e.g. topology views and bandwidth data) that automatically reflect what has occurred in the network, and been signalled by the control plane signalling.

The method described above is not limited to a single network domain. In an embodiment of the invention, the network management system collects inter-domain topology information.

A further aspect of the invention provides apparatus for use at a network management node of a connection-oriented network. The apparatus comprises a first module arranged to listen to topology advertisements in a control plane of the network. The apparatus further comprises a second module arranged to send Link Management Protocol (LMP) requests. The apparatus further comprises a third module arranged to store information carried in the topology advertisements and to selectively cause the second module to send Link Management Protocol (LMP) requests based on the information carried in the topology advertisements.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable instructions can be downloaded to the storage medium via a network connection.

BRIEF DESCRIPTION OF THE DRAWINGS

Embodiments of the invention will be described, by way of example only, with reference to the accompanying drawings in which.

DETAILED DESCRIPTION

Figure 1:
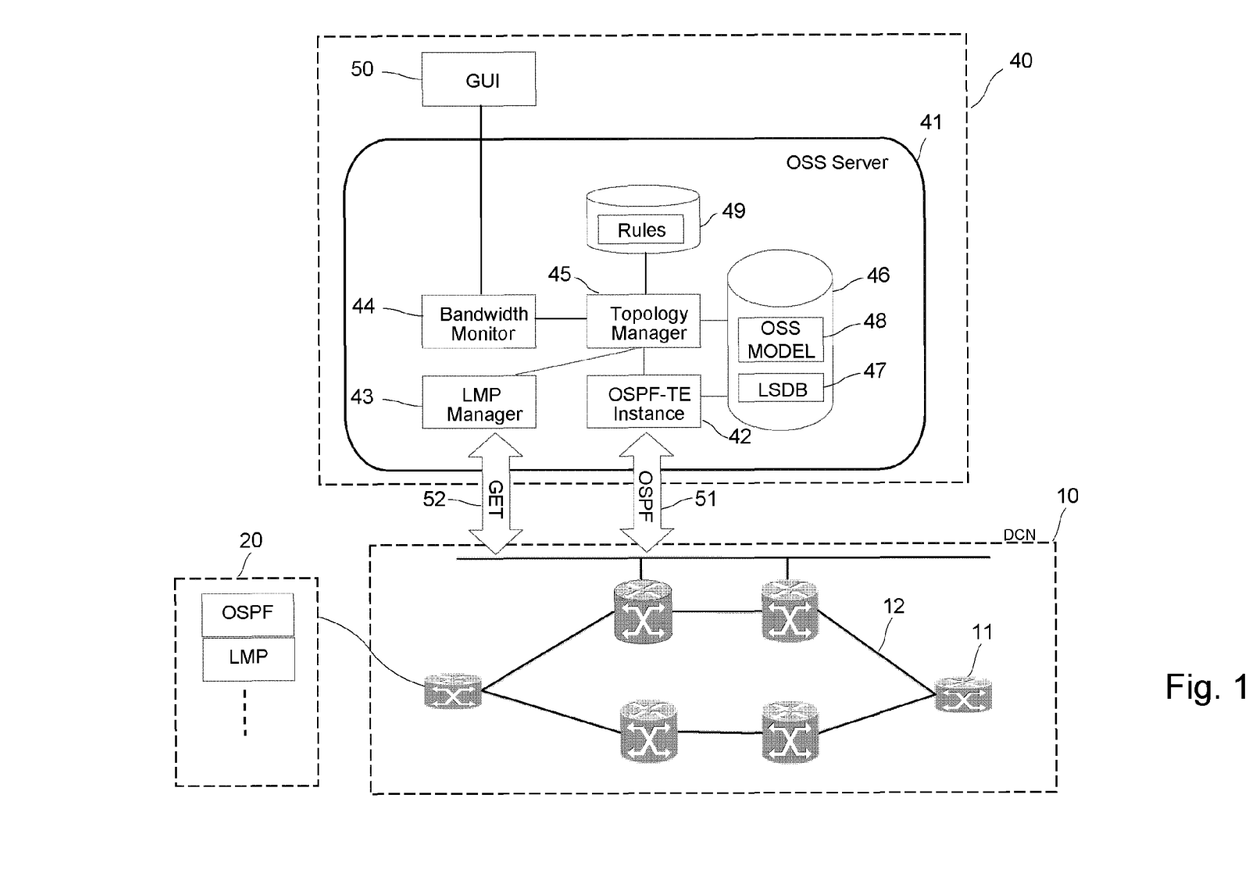
FIG. 1 shows a network and a management node according to an embodiment of the invention.

FIG. 1 shows a schematic overview of a communications network 10 and a management node 40 according to an embodiment of the present invention. The network comprises a plurality of nodes 11 connected by links 12. Management node 40 comprises an OSS server 41. The OSS server 41 comprises a set of functional units 42-45 and a store 46 which stores topology data about the network 10. The topology data comprises a Link State Database (LSDB) 47 and an OSS model 48. The OSS model 48 contains more detailed information, acquired via the LMP, which is not typically held in the LSDB 47. Also, in case of some faults, it is possible that the LSDB could "miss" a portion of the network, while the OSS model will still have the complete view. The OSS server 41 manages discrepancies between the OSS model 48 and LSDB 47. Although the LSDB 47 and OSS model 48 are shown stored in the same physical store 46, they can be stored separately.

The network 10 schematically shown in FIG. 1 can comprise a GMPLS network with at least one of: a circuit-switched network (e.g. an SDH or WDM network) and a packet-switched network, such as a Multi-Protocol Label Switching (MPLS) network. The GMPLS network can comprise a Multi-Protocol Label Switching-Transport Profile (MPLS-TP) network. Each node 11 comprises a Label Switched Router (LSR) which makes a switching decision based on at least one of: a label carried by an MPLS header of a traffic unit, contents of a frame or packet header, time slot, wavelength, fibre or physical port of the traffic received at the node 11.

Node 40 participates in OSPF-TE signalling within the network 10, as shown by signalling flow 51. Node 40 also, selectively, performs LMP enquiries to the network 10, and receives responses, as shown by signalling flow 52. Data gathered from OSPF and LMP signalling is stored in store 46. Advantageously, the format of data gathered from OSPF signalling is modified into a format compatible with the OSS. Each node 11 in the network 10 has a protocol stack 20 which includes OSPF and LMP, allowing each node to participate in OSPF and LMP signalling with other nodes 11 and the management node 40. The Link Management Protocol (LMP) is described in RFC 4204.

Figure 2:
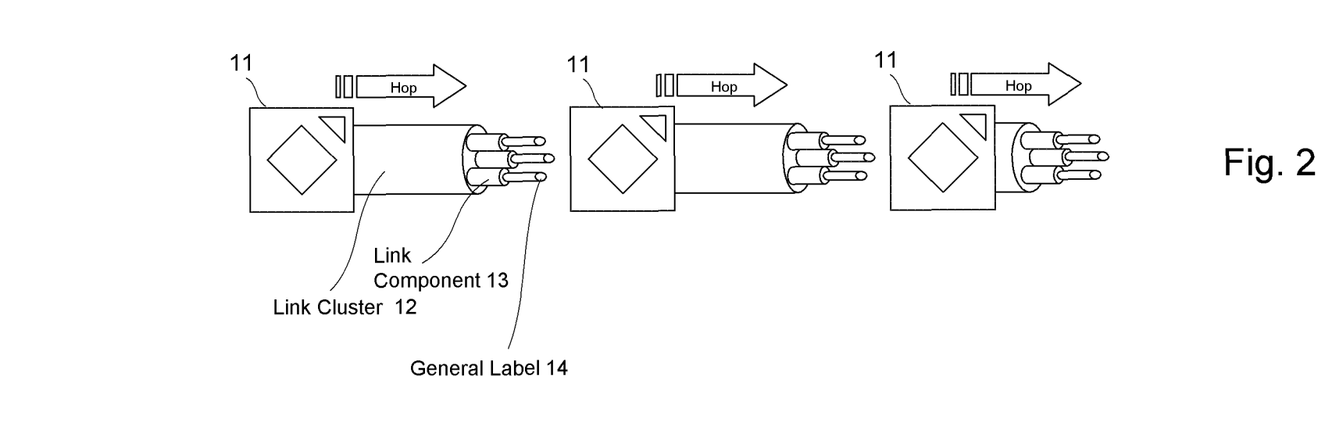
FIG. 2 shows a conventional representation of links between nodes of an SDH network.

FIG. 2 shows an example of a control plane view of a network link. A Traffic Engineering link (TE-Link) 12, or link cluster, exists between a pair of nodes 11 of the network 10. A TE-Link 12 can comprise multiple link components 13, typically called data links. Typically, the link components are homogeneous in terms of traffic engineering parameters and transmission rate. TE-Links 12 are advertised by OSPF Link State Advertisements (LSA). The content of the TE-Links 12 (i.e. details of link components 13) are not advertised by OSPF, or stored in the LSDB. LMP provides connectivity details of the Link components 13. This is useful information to allocate the correct resources while performing service provisioning and when correlating alarms from both the data plane and the control plane.

Figure 3:
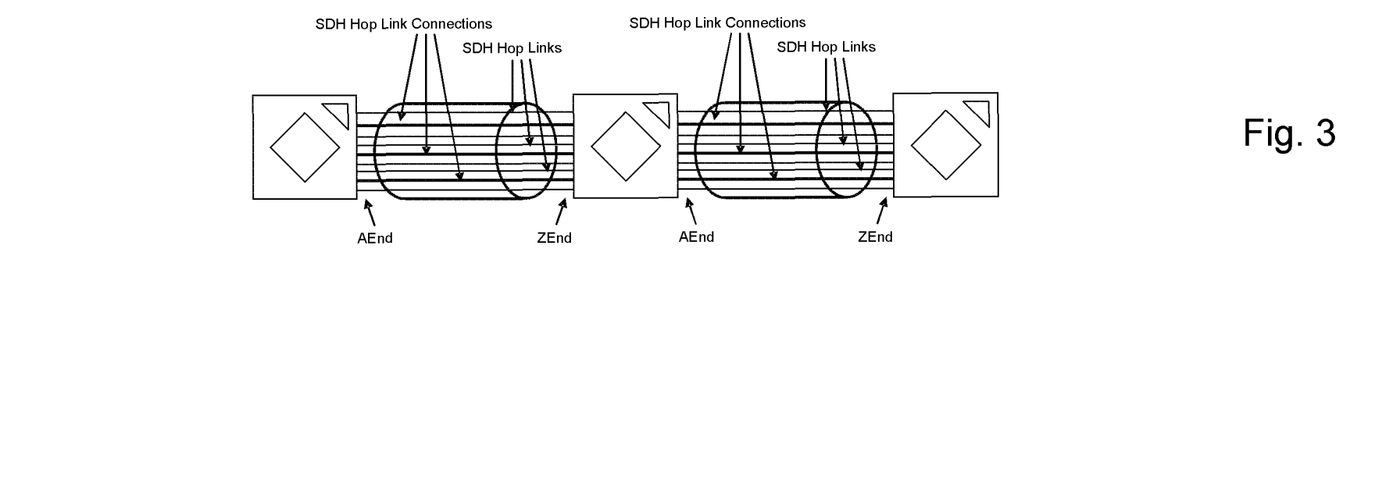
FIG. 3 shows a representation of links between nodes in a GMPLS network.

FIG. 3 shows the typical way of modelling topological links between network nodes from a data plane point of view. An SDH network is given as an example. A link (e.g. an SDH Hop Link) contains a channel (e.g. an SDH Hop Link connection). Another network technology type such as DWDM will have a specific way of representing links and connections at the data plane.

Figure 4:
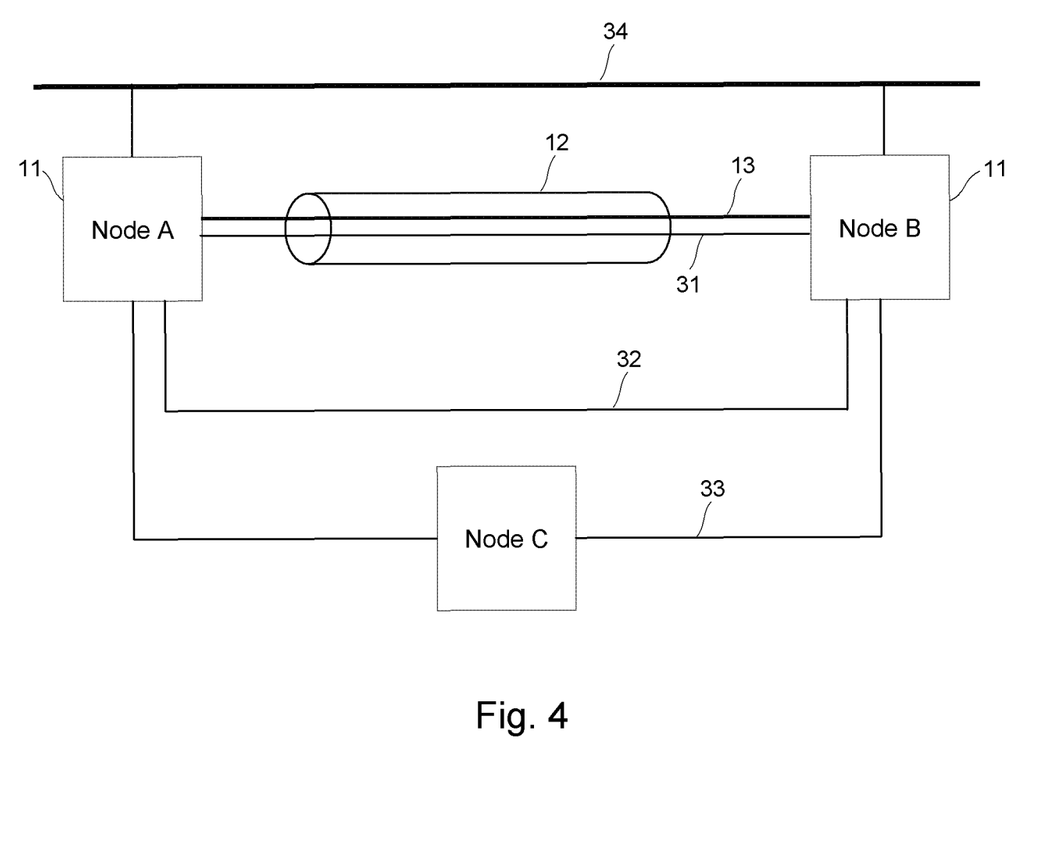
FIG. 4 shows possible types of control channel in a GMPLS network.

A TE-Link 12 has a control channel associated with it. The control channel can be used to exchange control plane information such as link provisioning and fault management information, path management and label distribution information and network topology and state distribution information. A single link can have multiple control channels associated with it for resiliency. FIG. 4 shows possible options for a control channel between Node A and Node B of the network 10. A Direct In-Band Control Channel 31 is routed with the TE-Link 12. Link Components 13 carry control channel (CC) payload for the In-Band CC 31. A Direct Out-Of-Band Control Channel 32 is routed directly between Node A and Node B, but separately from the TE-Link 12. An Indirect Control Channel 33 is routed separately from the TE-Link 12, via at least one intermediate node (Node C). A LAN based Control Channel is routed separately from the TE-Link 12, via a Local Area Network (LAN). LMP provides connectivity details of Control Channels. This is required by control plane protocol stacks in order to perform distributed operations such as control plane signalling etc. Management node 40 obtains details of control channels by performing LMP GET operations.

OSS Server 41 in the management node 40 hosts an OSS Application. In an embodiment of the invention, the OSS server 41 is advertised in the OSPF area as a router with no bandwidth available. This allows the OSS server 41 to participate in OSPF signalling about topology changes in network 10, which include changes to logical connectivity and changes to bandwidth allocation. By advertising a zero bandwidth, the OSS server 41 will not be used by the other nodes 11 to compute optimal paths as it advertises zero bandwidth. The OSS server 41 advertises an OSPF priority value that does not imply a designation of the OSS server as a designated or backup designated router. OSS Server 41 participates in the OSPF protocol for the specific control plane and creates a Link State Database (LSDB) 47 in terms of: nodes in the control plane; node adjacencies; TE Links and bandwidth allocation on the TE-Links. The OSS LSDB 47 is used to populate the OSS data model 48 in order to build the control plane topology. The OSS LSDB 47 is populated according to the OSPF standards. Bandwidth modification is flooded in the standard OSPF way. Typically, this involves setting the timers to 5 seconds (minimum) value in order to have a quick protocol convergence while updating the OSS data model. In order to manage the topology and the bandwidth information the LSA information is needed. Therefore, the OSS server 41 acquires the following packets managed by OSPF: Database Description (DD); Link State Update; Link State Acknowledge. These packets are the one that carry/manage LSAs. RFC1247 describes the OSPF protocol and LSAs in detail. Each time a new LSA is managed by the OSPF-TE instance 42 (and a change in the LSDB 47 is detected) this shall be forwarded to the Topology Manager module 45.

The topology manager module 45 determines if an LMP query is needed to complete the update of the OSS topology data model in terms of: Data Links (link components 13) and Control Channels. Information about the above LMP resources will therefore only be retrieved when needed, by performing LMP queries 52, such as system startup, network reconciliation, LSA monitoring in case it implies some potential LMP modification. This minimises both CPU and DCN load.

The following table summarises LMP queries needed depending on the OSPF based LSA information in terms of Label Switching Routers (LSR) and TE-Link Managed Objects. Topology Manager module 45 stores 49 a rule set which indicates what LMP queries (if any) are required for each possible OSPF-TE topology change.

TABLE 1

LMP queries and related triggers

| OSPF-TE Topology Change | LMP Queries | Notes |
|---|---|---|
| LSR addition | None | Information about data links and control channels is only requested when "connectivity" changes are detected, i.e. changes to TE-Links and Adjacencies. |
| LSR deletion | None | The OSS system will take autonomous decisions based on its topology model. |
| Adjacency addition | Control Channels on broadcast Interfaces. | The OSS system will request information about Control channels configured on broadcast control interfaces. Query to the following LMP tables: lmpNbrTable to get the adjacency information; lmpCtrlIfTable to get relevant information about the broadcast control interfaces; lmpControlChannelTable to get the control channel associated to the broadcast Control Interfaces. |
| Adjacency deletion | None | The OSS system will take autonomous decisions based on its topology model. |
| TE-Link addition | Get Data Links (link components) information. Get Control Channel information on P2P Interfaces. | Query to the following LMP tables: lmpTE-LinkTable to get the TE-Link information; lmpDataLinkOnTeTable to get the list of data links configured on the TE-Link; lmpDataLinkTable to get the list of the data links associated to the TE Link; lmpCtrlIfTable to get the relevant information of the p2p control interfaces configured on the new data links; lmpControlChannelTable to get the control channel associated to the p2p Control Interfaces. |
| TE-Link deletion | None | The OSS system will take autonomous decisions based on its topology model. |
| TE-Link BW modification | Check for Data Link addition. Check for Data Link deletion. | The systems shall perform "light" LMP querying to check if there are Data Links or Control Channels added/removed. Query LMP table lmpDataLinkOnTeTable to get the list of data links configured on the TE-Link. Determine if the bandwidth modification is due to an addition/deletion of a data link on the TE-Link. In the case where an addition is detected, then a lmpDataLinkTable get is needed to get the relevant details about the data link and it is also necessary to perform a get on the related control interfaces and control channels table as specified in the TE-Link addition case in order to get all the relevant inband control channels. |

TABLE 1-continued

LMP queries and related triggers

| OSPF-TE Topology Change | LMP Queries | Notes |
|---|---|---|
| TE-Link operational state changes | None | |
| TE-Link administrative state changes | None | |

In Table 1 "Broadcast IF" is a Broadcast Interface and "P2P IF" is a Point-to-Point Interface. A P2P IF is a CC carried inside a Link Component. A Broadcast IF is typically configured on the Ethernet ports available on the nodes that are attached to the LAN infrastructure. They are typically used for out of band control channels.

In Table 1 "adjacency" is a neighbour relationship between two nodes.

Functional Modules and Related Functions

An embodiment of an OSS server 41 which performs OSPF based GMPLS topology discovery is shown in FIG. 1. The functional modules 42-45 will be briefly described, and then described in more detail.

OSPF-TE instance: this module participates in the OSPF protocol of the selected routing area;

LMP manager: this module performs LMP queries, as needed, to collect the relevant information about Data Links that are part of a specific TE-Link and Control Channels configured in the SCN (Signalling Communication Network).

Topology Manager: this module implements the following functions: orchestration of both OSPF-TE instance and LMP manager modules 42, 43; Bandwidth updates notification to the Bandwidth Monitor 44; Translation from the LSDB format to the OSS Model format; OSS Model persistence management.

Bandwidth Monitor: this module implements a set of bandwidth modification notifications for the presentation components (GUIs).

The modules 42-45 described above can be implemented as software modules executed by a processor, by hardware, or a combination of software and hardware.

Bandwidth Monitor, 44

This module is responsible for managing bandwidth deltas, in response to events received from the topology manager module. Bandwidth information can be output to a graphical user-interface (GUI) 50 for display in user-friendly manner, such as a dashboard visualisation with a graphical dashboard showing, in real-time, the bandwidth availability modification for one or more selected TE-links in the network 10.

OSPF-TE Instance, 42

This module is a software component implementing the standard OSPF-TE protocol to manage the related LSDB (Link State Data Base). This module has a socket based interface (IF) with the DCN in order to participate to the OSPF protocol with the managed network elements. This IF should be compliant to the current OSPF requirements in terms of communication protocol. The module also has an IF with the Topology Manager module. The OSPF-TE instance module forwards to the Topology Manager module every LSDB modifications. This module is an OSPF-TE instance with ZERO available bandwidth for its entire life-cycle. The priority of this OSPF-TE instance is set in a way to avoid to make it a designated router or a backup designated router.

LMP Manager, 43

This module is a software component responsible to correlate OSPF-TE topology information with LMP topology information. The following MOs are correlated by the LMP Manager: relationship between a TE-Link and the configured Data Links; relationships of the TE-Link and the configured Control Channels. This module has the following interfaces (IF): an SNMP based interface to the DCN in order to perform standard LMP queries to the relevant managed network elements; an IF with the Topology Manager in order to expose the related LMP query services.

Topology Manager, 45

This module manages both the data plane and control plane topology models and the relationships between the two. The module listens for incoming OSPF notifications from the related module OSPF-TE instance 42. The module translates the typical OSPF Link State information into a format that is understood by the common OSS network model. The module performs LMP queries when needed depending on the model update implied by a specific LSA received information (see Table 1). The module translates LMP data into a format that is understood by the common OSS network model. The module updates the bandwidth monitoring module 44 while receiving bandwidth modification information from the OSPF-TE instance 42. This module has the following interfaces (IF): event notification IF with the OSPF-TE instance module in order to receive LSDB notifications; an IF with the OSS data layer in order to update the common OSS network model with the relevant topology information; an IF with the LMP Manager module in order to start LMP queries when needed depending on the notification received from the OSPF-TE instance module (e.g. addition of a new TE-Link); an IF with the Bandwidth Monitor module in order to dynamically update it with bandwidth modification information to be presented to an hypothetical dashboard based visualization system.

Figure 5A:
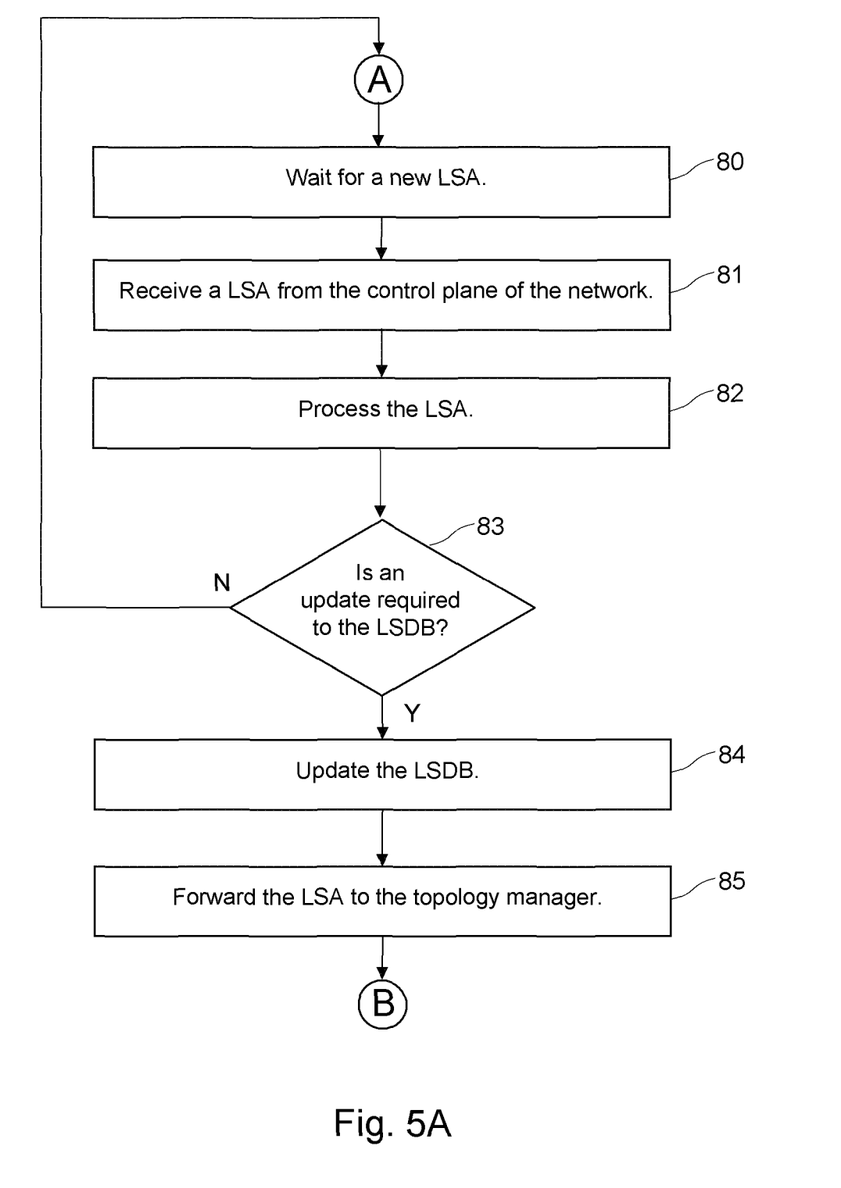
FIGS. 5A and 5B show a method of processing Link State Advertisements (LSAs) at the management node of FIG. 1.
Figure 5B:
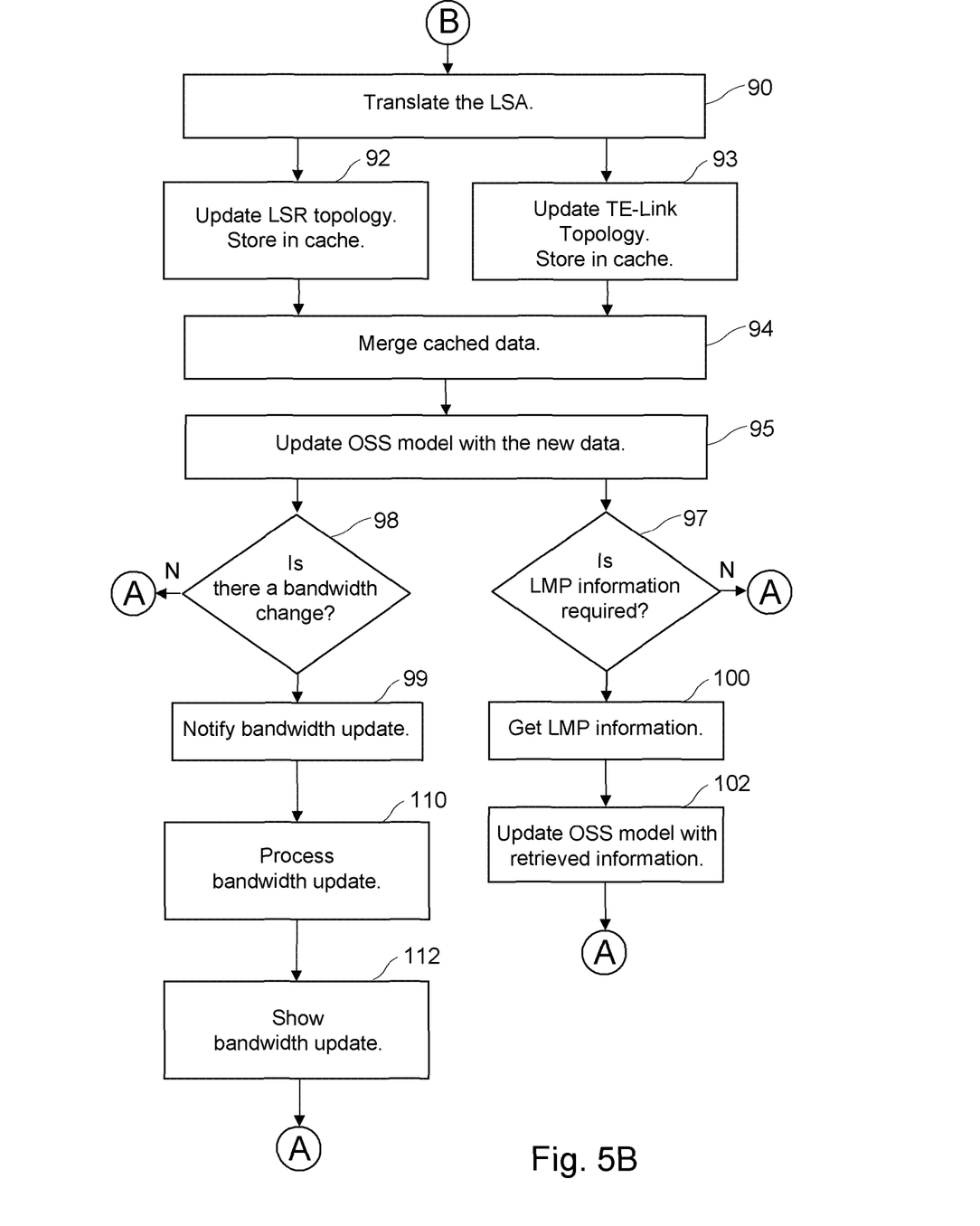

FIGS. 5A and 5B show a method of operating the OSS server 41 in response to receiving a LSA. Steps 81-85 are performed by the OSPF-TE module 42. Steps 90-99 are performed by the Topology Manager module 45. Step 100 is performed by the LMP Manager 43. Steps 110, 112 are performed by the Bandwidth Monitor 44. Step 80 waits—or "listens"—for the arrival of a new LSA via the control plane of the network. At step 81 a LSA is received at the management node, via the control plane of the network. The LSA contains OSPF topology information. At step 82 the LSA is processed by the OSPF-TE module 42, extracting the required information about network topology. Step 83 detects if there is a change in the LSDB. A change is detected by comparing information in the received LSA with information already stored in the LSDB. If no change in the LSDB is detected at step 83, the method proceeds to wait for the next LSA. If a change in the LSDB is detected at step 83, the method proceeds to step 84 and updates the LSDB, storing the information from the new LSA. Step 85 forwards the LSA to the Topology Manager module 45.

At step 90 the Topology Manager module 45 translates the LSA into a format suitable for the OSS model. This comprises breaking the LSA information into a set of topology resources to be processed. Two parallel processing flows are started. A first flow (step 92) is an update procedure for topology modification regarding Label Switched Routers (LSR). This procedure can comprise: LSR addition or LSR removal. A second flow (step 93) is an update procedure for topology modification regarding TE-Links This procedure can comprise: TE-Link addition; TE-Link removal; TE-Link bandwidth modification; TE-Link operational state changes; TE-Link administrative state changes. Step 94 merges LSR and TE-Link topology information retrieved in the previous steps 92, 93. At step 95 the Topology Manager module 45 updates the OSS model with the merged topology information of step 94. Once the OSS model has been updated, the Topology Manager module 45 starts two parallel procedures: (i) LMP information management (step 97) and (ii) bandwidth change management (steps 98, 99). The LMP information management of step 97 is detailed in Table 1. In case of TE-Link addition or TE-Link bandwidth modification, then the Topology Manager module 45 requests LMP related information from the LMP Manager module 43. At step 100, the LMP Manager 43 obtains the LMP information from the network 10 by sending LMP messages. At step 102 the Topology Manager module 45 updates the OSS model with the information retrieved from the LMP Manager 43. If step 97 determines that no LMP information is required, the method proceeds to wait for the next incoming LSA.

Step 98 determines if there is a bandwidth change. If so, the Topology Manager module 45 notifies the Bandwidth Monitor module 44 of the change at step 99. The Bandwidth Monitor module 44 processes the bandwidth update (step 110) in order to show the bandwidth DELTA (step 112) on the monitored resources (TE-Links, overall Network, etc.) If step 98 does not detect a bandwidth change, the method proceeds to wait for the next incoming LSA.

The method described above is not limited to a single network domain. In an embodiment of the invention, the network management system collects inter-domain topology information. This can be achieved by adding further OSPF-TE instances 42 in the OSS server 41.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of operating a network management node of a connection-oriented network comprising nodes, the method comprising:
   participating in control plane signalling in the connection-oriented network by sending topology advertisements, wherein the topology advertisements sent from the network management node advertise at least one of: a zero bandwidth and a priority value which does not imply a designation as a designated router or a backup designated router;
   listening to topology advertisements in a control plane of the network;
   storing information carried in the topology advertisements; and
   selectively sending Link Management Protocol (LMP) requests based on the information carried in the topology advertisements.

2. A method according to claim 1 wherein the step of selectively sending LMP, requests is performed for at least one of the following events:
   adjacency addition;
   addition of a link between nodes;
   deletion of a link between nodes; and
   modification to the bandwidth of a link between nodes.

3. A method according to claim 2 wherein the step of selectively sending LMP, requests is performed for adjacency addition and comprises requesting information about control channels configured on broadcast control interfaces.

4. A method according to claim 2 wherein the step of selectively sending LMP, requests is performed for an addition of a link and comprises:
   requesting information about link components; and
   requesting information about control channels on point-to-point (P2P) interfaces.

5. A method according to claim 2 wherein the step of selectively sending LMP, requests is performed for a modification to the bandwidth of a link and comprises:
   querying the link components configured on the link; and
   determining if the link components of the link have changed.

6. A method according to claim 1, wherein the step of storing information carried in the topology advertisements comprises an initial step of translating the information carried in the topology advertisements into a format used by an Operations Support System (OSS) model.

7. A method according to claim 1, wherein the connection-oriented network is a Generalised Multi-Protocol Label Switched (GMPLS) network.

8. A method according to claim 1, wherein the topology advertisements are link state advertisements.

9. A method according to claim 1, wherein the topology advertisements are Open Shortest Path First-Traffic Engineering (OSPF-TE) advertisements.

10. An apparatus for use at a network management node of a connection-oriented network comprising nodes, the apparatus comprising:
    a first module arranged to send and listen to topology advertisements in a control plane of the connection-oriented network, wherein the topology advertisements sent advertise at least one of: a zero bandwidth and a priority value which does not imply a designation as a designated router or a backup designated router;
    a second module arranged to send Link Management Protocol (LMP) requests; and
    a third module arranged to store information carried in the topology advertisements and to selectively cause the second module to send Link Management Protocol (LMP) requests based on the information carried in the topology advertisements.

11. An apparatus according to claim 10 wherein the third module is arranged to cause the second module to send Link Management Protocol (LMP) requests in response to at least one of the following events:
    adjacency addition;
    addition of a link between nodes;
    deletion of a link between nodes; and
    modification to the bandwidth of a link between nodes.

12. An apparatus according to claim 11 wherein, in response to the modification to the bandwidth of a link between nodes, the third module is arranged to cause the second module to send Link Management Protocol (LMP) requests to query the link components configured on the link and to determine if the link components of the link have changed.

13. A non-transitory machine-readable storage medium having instructions stored therein, which when executed by a processor, cause the processor to perform a method, the method comprising:
   participating in control plane signalling in the connection-oriented network by sending topology advertisements, wherein the topology advertisements sent from the network management node advertise at least one of: a zero bandwidth and a priority value which does not imply a designation as a designated router or a backup designated router;
   listening to topology advertisements in a control plane of the network;
   storing information carried in the topology advertisements; and
   selectively sending Link Management Protocol (LMP) requests based on the information carried in the topology advertisements.

14. A non-transitory machine-readable storage medium according to claim 13, wherein the step of selectively sending LMP requests is performed for at least one of the following events:
   adjacency addition;
   addition of a link between nodes;
   deletion of a link between nodes; and
   modification to the bandwidth of a link between nodes.

15. A non-transitory machine-readable storage medium according to claim 14, wherein the step of selectively sending LMP requests is performed for adjacency addition and comprises requesting information about control channels configured on broadcast control interfaces.

16. A non-transitory machine-readable storage medium according to claim 14, wherein the step of selectively sending LMP requests is performed for an addition of a link and comprises:
   requesting information about link components; and
   requesting information about control channels on point-to-point (P2P) interfaces.

17. A non-transitory machine-readable storage medium according to claim 14, wherein the step of selectively sending LMP requests is performed for a modification to the bandwidth of a link and comprises:
   querying the link components configured on the link; and
   determining if the link components of the link have changed.

18. A non-transitory machine-readable storage medium according to claim 13, wherein the step of storing information carried in the topology advertisements comprises an initial step of translating the information carried in the topology advertisements into a format used by an Operations Support System (OSS) model.

19. A non-transitory machine-readable storage medium according to claim 13, wherein the connection-oriented network is a Generalised Multi-Protocol Label Switched (GMPLS) network.

20. A non-transitory machine-readable storage medium according to claim 13, wherein the topology advertisements are link state advertisements.

21. A non-transitory machine-readable storage medium according to claim 13, wherein the topology advertisements are Open Shortest Path First-Traffic Engineering (OSPF-TE) advertisements.

* * * * *

UNITED STATES PATENT AND TRADEMARK OFFICE
CERTIFICATE OF CORRECTION

PATENT NO. : 9,007,916 B2  Page 1 of 1
APPLICATION NO. : 13/807695
DATED : April 14, 2015
INVENTOR(S) : Maggiari et al.

It is certified that error appears in the above-identified patent and that said Letters Patent is hereby corrected as shown below:

IN THE SPECIFICATION

In Column 9, Line 14, delete "TE-Links" and insert -- TE-Links. --, therefor.

IN THE CLAIMS

In Column 10, Line 9, in Claim 2, delete "LMP," and insert -- LMP --, therefor.

In Column 10, Line 16, in Claim 3, delete "LMP," and insert -- LMP --, therefor.

In Column 10, Line 20, in Claim 4, delete "LMP," and insert -- LMP --, therefor.

In Column 10, Line 26, in Claim 5, delete "LMP," and insert -- LMP --, therefor.

Signed and Sealed this
Twenty-third Day of February, 2016

Michelle K. Lee
*Director of the United States Patent and Trademark Office*